US010248861B2

(12) United States Patent
Ichihara

(10) Patent No.: US 10,248,861 B2
(45) Date of Patent: Apr. 2, 2019

(54) SYSTEM FOR IDENTIFYING AN UNMANNED MOVING OBJECT

(71) Applicant: PRODRONE CO., LTD., Nagoya-shi, Aichi (JP)

(72) Inventor: Kazuo Ichihara, Nagoya (JP)

(73) Assignee: PRODRONE CO., LTD., Nagoya (JP)

( * ) Notice: Subject to any disclaimer, the term of this patent is extended or adjusted under 35 U.S.C. 154(b) by 0 days.

(21) Appl. No.: 15/765,461

(22) PCT Filed: May 10, 2016

(86) PCT No.: PCT/JP2016/063881
§ 371 (c)(1),
(2) Date: Apr. 2, 2018

(87) PCT Pub. No.: WO2017/195274
PCT Pub. Date: Nov. 16, 2017

(65) Prior Publication Data
US 2018/0307907 A1    Oct. 25, 2018

(51) Int. Cl.
G06K 9/00        (2006.01)
G06Q 50/10       (2012.01)
B64C 39/02       (2006.01)

(52) U.S. Cl.
CPC ........ G06K 9/00664 (2013.01); B64C 39/024 (2013.01); G06Q 50/10 (2013.01); B64C 2201/127 (2013.01); B64C 2201/145 (2013.01)

(58) Field of Classification Search
CPC .............. G06K 9/00664; B64C 39/024; B64C 2201/145; B64C 2201/127

(Continued)

(56) References Cited

U.S. PATENT DOCUMENTS 6,804,607 B1 * 10/2004 Wood .................. G01S 3/784
                                                180/167
7,970,532 B2 *  6/2011 Tehan .................. G05D 1/0646
                                                701/23

(Continued)

FOREIGN PATENT DOCUMENTS

JP    H11-31176 A      2/1999
JP    2004-336408 A   11/2004

(Continued)

OTHER PUBLICATIONS

Jul. 19, 2016 International Search Report issued in International Patent Application No. PCT/JP2016/063881.

Primary Examiner — Sheela C Chawan
(74) Attorney, Agent, or Firm — Oliff PLC

(57) ABSTRACT

A system for identifying an unmanned moving object, including: a mobile terminal, an unmanned moving object provided with moving means for enabling the object to move arbitrarily, a management server provided with a database to which specific information including possessor information of the unmanned moving object and individual object management information correlating with the specific information are input, and a communication network which enables communication between the mobile terminal and the management server, wherein identification information that is acquired when a user of the mobile terminal has encountered the unmanned moving object is associated with the individual object management information in advance and the mobile terminal acquires the identification information, acquires specific information by checking the identification information of the mobile terminal for a match within the individual object management information on the management server, and ascertains the possessor information of the unmanned moving object.

5 Claims, 7 Drawing Sheets

(58) Field of Classification Search
USPC .......... 382/103, 100, 104, 107; 701/1, 3, 23, 701/24, 25, 300, 301, 400, 408, 468; 342/29, 36, 61, 63, 52, 54, 57
See application file for complete search history.

(56) References Cited

U.S. PATENT DOCUMENTS

| | | |
|---|---|---|
| 2003/0122701 A1* | 7/2003 | Tran .................... G01S 13/9303 342/29 |
| 2010/0017114 A1 | 1/2010 | Tehan et al. |
| 2014/0018979 A1* | 1/2014 | Goossen .............. G08G 5/0034 701/3 |
| 2014/0131510 A1 | 5/2014 | Wang et al. |
| 2015/0237136 A1 | 8/2015 | Enomoto |
| 2018/0108260 A1* | 4/2018 | Kuhara ................ G08G 5/0034 |

FOREIGN PATENT DOCUMENTS

| | | |
|---|---|---|
| JP | 2005-157600 A | 6/2005 |
| JP | 2008-308154 A | 12/2008 |
| JP | 2014-67244 A | 4/2014 |
| JP | 2016-505435 A | 2/2016 |

* cited by examiner

Example 1

| | Unmanned moving object | Mobile terminal | Management server |
|---|---|---|---|
| Function | RF ID tag | RF reader | |
| Identification information | ID information | | |
| Individual object management information | | | Table associating ID info with specific information |
| Specific information | | | · A place where it has come from (what it belongs to)<br>· Contact destination Of operator<br>· Photograhic image of moving object |

FIG. 6

Example 2

| | Unmanned Moving object | Mobile terminal | Management server |
|---|---|---|---|
| Function | | camera, GPS, Gravity sensor | |
| Identification information | | Moving direction information (Positional information, time information) | |
| Individual object management information | | | Flight plan (Positional information, time information) |
| Specific information | | | · A place where it has come from (what it belongs to)<br>· Contact destination of operator<br>· Photograhic image of moving object |

FIG. 7

SYSTEM FOR IDENTIFYING AN UNMANNED MOVING OBJECT

TECHNICAL FIELD

The present invention relates to a system for identifying an unmanned moving object that enables it, when an ordinary person encounters an unmanned moving object such as a drone, to identify what unmanned moving object it is.

BACKGROUND ART

Unmanned aerial vehicles (which may be abbreviated to UAVs hereinafter), as unmanned moving objects, have lately been used in a wide range of fields such as airborne photography, scouting, surveillance, target capturing, scientific research, geographical survey, remote exploration, etc. (refer to, e.g., PTL1 and PTL2).

CITATION LIST

Patent Literature

PTL1: JP 2008-308154 A
PTL2: JP 2016-505435 A

SUMMARY OF INVENTION

Technical Problem

As the number of UAVs that are used increases, there is increasing chance that an ordinary person happens to see a UAV usually in livelihood. Then, if an ordinary person has found a UAV, that person may want to know what UAV it is.

In a present situation, however, as for a UAV that an ordinary person has happened to see, there has been no means for identifying, inter alia, possessor information of the UAV and what the UAV belongs to. Meanwhile, on the exterior surface of a UAV, there may be markings of what it belongs to, a contact destination, etc. But if the UAV is at a long distance, it is extremely hard for the person to see such markings visually.

Meanwhile, even if the UAV has come close to an ordinary person, it is difficult to see the markings on the surface of the UAV flying at a certain level of speed. Particularly, since the markings, such as letters on the surface become smaller, as UAVs are more miniaturized, it becomes more difficult to see such markings.

Meanwhile, in some situations, a UAV may fly abnormally because of failure or the like. A person who discovered such an abnormal UAV may think to pass a notion to the UAV operator. In a present situation, however, since it is impossible to identify the UAV operator, as noted above, the discoverer has been unable to pass information such as an abnormal flight of a UAV, to the operator.

From a standpoint of the UAV operator, in the event that the UAV crashed due to failure at a great distance, if, inter alia, the location of the crash can be determined, retrieving the UAV and related work would be easy. If information on the failed UAV is reported to the operator, it can be used to search for the UAV. If it is possible for a person who discovered the UAV to easily perform providing the relevant information to the operator, the operator can acquire various pieces of information.

An object of the present invention resides in providing a system for identifying an unmanned moving object by which, when an ordinary person has discovered an unmanned moving object, it is possible to acquire information such as what the unmanned moving object belongs to and its operation among others.

Solution to Problem

To solve the foregoing problem, a system for identifying an unmanned moving object, of the present invention, includes:

a mobile terminal;

an unmanned moving object provided with moving means for enabling the object to move arbitrarily;

a management server provided with a database to which specific information including possessor information of the unmanned moving object and individual object management information correlating with the specific information are input; and a communication network which enables communication between the mobile terminal and the management server, wherein identification information that is acquired from the unmanned moving object when a user of the mobile terminal has encountered the unmanned moving object is associated with the individual object management information in advance, the system includes:

an identification information acquiring step in which the mobile terminal acquires the identification information from the unmanned moving object;

a specific information acquiring step in which the mobile terminal checks the identification information for a match within the individual object management information on the management server and acquires specific information of the unmanned moving object; and a specific information ascertaining step in which the user of the mobile terminal ascertains the possessor information of the unmanned moving object using the acquired specific information.

The system for identifying an unmanned moving object may be configured as below:

the unmanned moving object includes an RF ID tag in which ID information is stored as the identification information and the mobile terminal includes an RF reader capable of wirelessly communicating with the RF ID tag;

the individual object management information on the management server is data associating the ID information with the specific information;

the identification information acquiring step is the step in which the mobile terminal acquires the ID information as identification information through wireless communication between the RF reader and the RF ID tag; and the specific information acquiring step is the step of checking the ID information for a match within the individual object management information in the database and acquiring the specific information of the unmanned moving object.

The system for identifying an unmanned moving object may be configured as below:

the individual object management information is a flight plan including positional information and time information of the unmanned moving object;

the mobile terminal includes a camera function, a GPS function, and a gravity sensor function;

moving direction information including positional information and time information of the unmanned moving object, acquired through the GPS function and the gravity sensor function, when the mobile terminal user tracks the unmanned moving object using the camera function, is used as the identification information; and the mobile terminal checks the acquired moving direction information for a match with a flight plan on the management server and acquires the specific information on the management server.

In the system for identifying an unmanned moving object, it is preferable that:

the mobile terminal includes a display unit capable of displaying the specific information; and the specific information ascertaining step has the specific information displayed on the display unit and the user ascertains the possessor information with the display unit.

It is preferable that the system for identifying an unmanned moving object further includes:

a notion reporting step in which the mobile terminal user reports a notion about the unmanned moving object to an operator of the unmanned moving object.

In the system for identifying an unmanned moving object, it is preferable that the unmanned moving object is an unmanned aerial vehicle.

In the system for identifying an unmanned moving object, it is preferable that the specific information includes a photographic image of the manned moving object.

Advantageous Effects of Invention

A system for identifying an unmanned moving object of the present invention includes a mobile terminal, an unmanned moving object, a management server provided with a database to which specific information including possessor information of the unmanned moving object and individual object management information are input, and a communication network which enables communication between the mobile terminal and the management server. Identification information that is acquired from the unmanned moving object when a user of the mobile terminal has encountered the unmanned moving object is associated with the individual object management information in advance. The system includes an identification information acquiring step in which the mobile terminal acquires the identification information from the unmanned moving object, a specific information acquiring step in which the mobile terminal checks the identification information for a match within the individual object management information on the management server and acquires specific information of the unmanned moving object, and a specific information ascertaining step in which the user of the mobile terminal ascertains the possessor information of the unmanned moving object using the acquired specific information. By adopting such a configuration, an advantageous effect is obtained that makes it for an ordinary person, when having discovered an unmanned moving object, to acquire information such as what the unmanned moving object belongs to and its operation among others, using a mobile terminal that the person has, and identify the unmanned moving object.

BRIEF DESCRIPTION OF DRAWINGS

FIG. 6 is a diagram illustrating a configuration of a distinctive part of a method for putting the system for identifying a multicopter in practical use of Example 1.

FIG. 7 is a diagram illustrating a configuration of a distinctive part of a method for putting the system for identifying a multicopter in practical use of Example 2.

DESCRIPTION OF EMBODIMENTS

Figure 1:
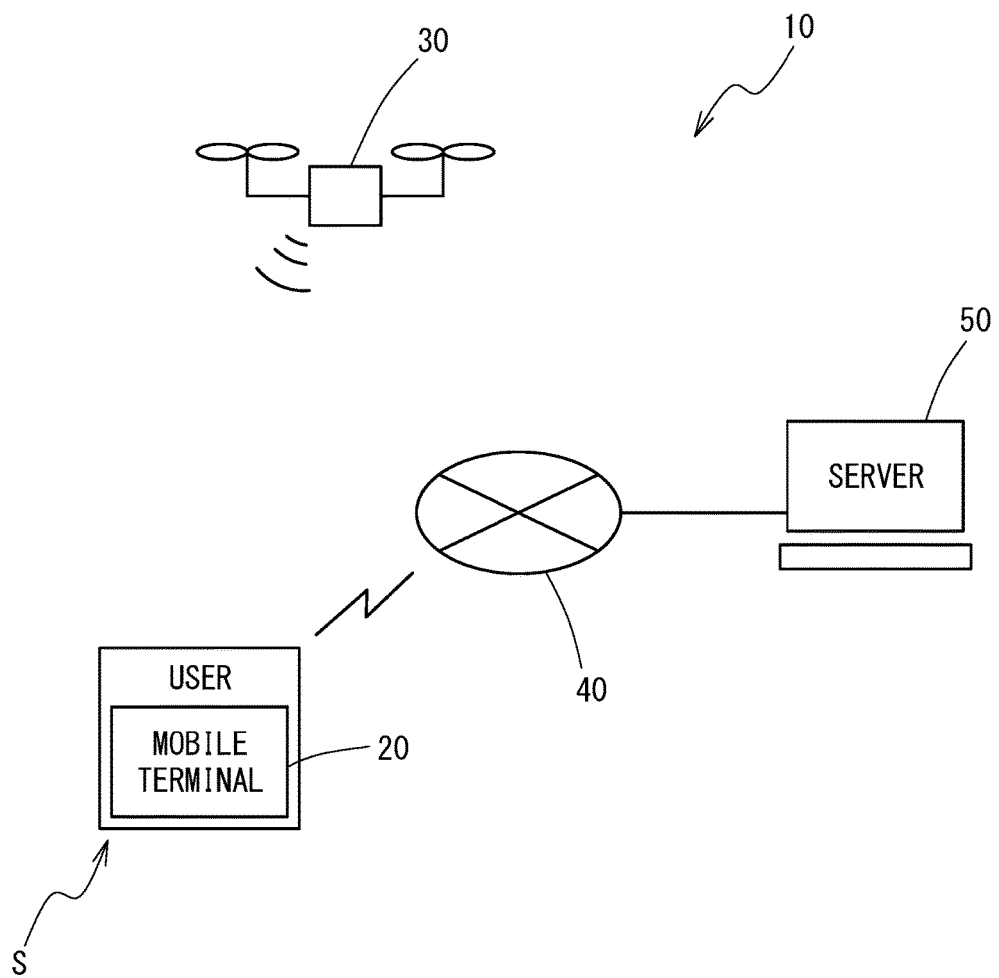
FIG. 1 is a diagram depicting an outlined structure of one example of a system for identifying an unmanned aerial vehicle, of the present invention.

In the following, a system of the present invention will be described in detail with the aid of the drawings. FIG. 1 is a diagram depicting an outlined structure of one example of a system for identifying an unmanned aerial vehicle, of the present invention. The example depicted in FIG. 1 is an example of the identifying system in which a multicopter which is one type of UAV is used as an unmanned moving object.

As depicted in FIG. 1, the system for identifying an unmanned aerial vehicle 10, of the example, is comprised of a mobile terminal 20 such as a high functionality mobile phone (smartphone) that an ordinary person S (who is the user of the mobile terminal and may hereinafter be referred to as the user) who is not an operator of the unmanned aerial vehicle has, a multicopter 30 as an unmanned moving object having moving means for enabling the object to move arbitrarily, flying in the air, and a server 50. The mobile terminal 20 and the server 50 are connected by a communication network 40 and configured to be able to transmit and receive data to/from each other.

The multicopter 30 is provided with an RF (Radio Frequency) ID tag unit in which individual object identification information has been stored and the mobile terminal 20 is provided with an RD reader unit (to be described later) capable of reading information from the RF ID tag unit. The mobile terminal 20 and the multicopter 30 have a wireless communication function comprised of the RF ID tag and the RF reader, are able to transmit and receive data, and are formed such that individual object identification of the multicopter 30 can be performed by the mobile terminal 20.

As the wireless communication function which is present in the mobile terminal 20 and the multicopter 30, a near field radio communication technology such as NFC (Near Field Communication), "iBeacon" (trademark of Apple Inc.), and BLE (Bluetooth Low Energy) ("Bluetooth" is a registered trademark of Bluetooth SIG, INC.) can be used. They are effective, inter alia, in a place where positional information based on GPS cannot be used.

Figure 2:
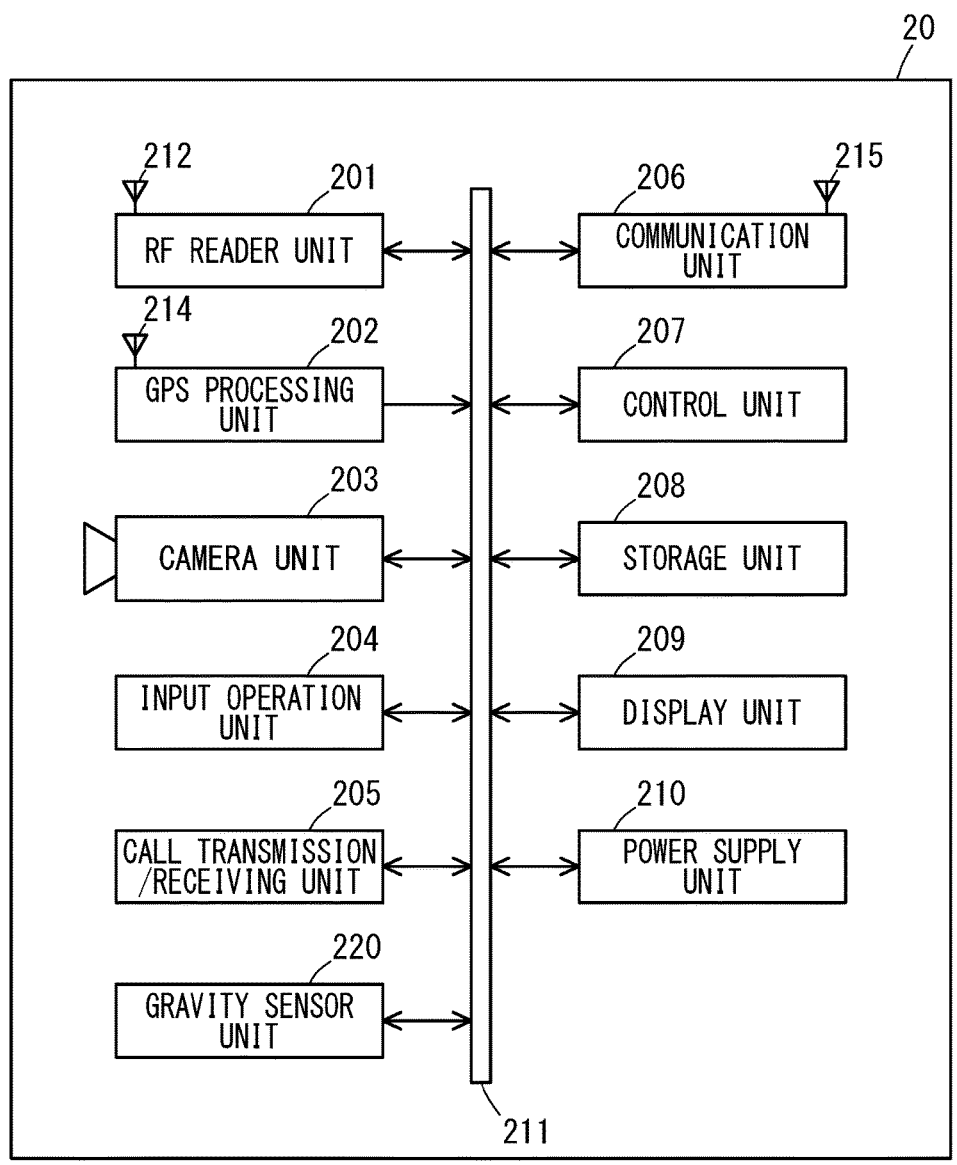
FIG. 2 is a block diagram depicting an outlined configuration of a mobile terminal in the system for identifying an unmanned aerial vehicle in FIG. 1.

FIG. 2 is a block diagram depicting an outlined configuration of a mobile terminal which is a constituent element of the system for identifying an unmanned aerial vehicle in FIG. 1. Unnecessary components for describing the present invention are left out of the diagram of FIG. 2. As depicted in FIG. 2, the mobile terminal 20 in FIG. 1 includes an RF reader unit 201, a GPS processing unit 202, a camera unit 203, an input operation unit 204, a call transmission/receiving unit 205, a communication unit 206, a control unit 207, a storage unit 208, a display unit 209, a power supply unit 210, a gravity sensor unit 220, etc. They are connected via a bus line 211.

As for the mobile terminal 20, a mobile phone, a mobile station for use in a mobile communication network, a tablet type terminal, PDA (Personal Data Assistants), etc. can be used, other than the smartphone.

The RF reader unit 201 of the mobile terminal 20 is formed to be able to wirelessly communicate with the RF ID tag unit 301 of the multicopter 30 and read individual object identification information (ID information) stored in the ID tag.

The GPS processing unit 202 receives a signal transmitted from a GPS satellite (not depicted) and determines the current position of the mobile terminal 20. In determining the position, a GPS signal transmitted from the GPS satellite is received by a receiving antenna 214 and transferred to the GPS processing unit 202, in which demodulation processing is performed to generate GPS information. Based on this GPS information, a predefined calculation to determine the position is executed and positional information such as latitude, longitude, altitude, etc., of the mobile terminal 20 is acquired. Acquired positional information is transferred to the control unit 207. Now, positional information may also be output to the storage unit 208 and retained temporarily.

The camera unit 203 is formed to allow the user to capture the multicopter 30 and display it on the display unit 209 according to a camera application. Furthermore, when the user S tracks the multicopter 30 captured by the camera unit 203, the cameral application 30 is adapted to be able to cognize, inter alia, the moving speed and moving direction of the multicopter 30, based on, inter alia, positional information acquired by the GPS processing unit 202 and information of camera orientation and movement acquired by the gravity sensor unit 220.

The input operation unit 204 is for the user to perform input operation. The input operation unit 204 is capable of displaying numeric keyboard buttons from 0 to 9 and various keys of alphabets, the Japanese language, and others which can be displayed on the display unit 209 of a touch panel type and are provided on a commonly used mobile phone.

The call transmission/receiving unit 205 allows the user to, inter alia, make a call with an external user of external equipment connected via the communication network 40. Specifically, the call transmission/receiving unit 205 includes a microphone, a speaker, a data conversion unit, etc. The call transmission/receiving unit 205 carries out A/D conversion processing on the user's voice to transmit, which is input from the microphone, through the data conversion unit and outputs voice data to transmit to the control unit 207. Also, voice data, such as received voice data, is subjected to D/A conversion processing through the data conversion unit and output from the speaker.

The communication unit 206 performs communication such as calls, e-mail, and the Internet, with external equipment such as another mobile phone, a PC, and a server, using, e.g., 3G/4G links, Wifi, etc. The communication unit 206 performs a series of processing tasks related to transmission and receiving such as modulation and demodulation processing, amplification processing, and A/D and D/A conversion processing, on carrier signals received by an antenna 212 and compressed signals of voice, images, and the like transferred from the control unit 207. An antenna 215 is the same as an antenna provided on a commonly used mobile phone and transmits and receives carriers to carry voice, data, and the like. Received carrier signals are transferred to the communication unit 206 and processed.

The control unit 207 is comprised of, e.g., a microprocessor, DSP, etc. and controls the respective parts of the mobile terminal 20 according to various processing programs for the mobile terminal 2 stored in the storage unit 208.

The storage unit 208 is comprised of, e.g., DRAMs or the like and includes a buffer memory to temporarily store data or the like to be processed by the control unit 207 or the like and a program memory or the like in which diverse programs and data pertaining to functions of the mobile terminal 20 are stored.

The display unit 209 includes a display screen of a touch panel type which is, however, not depicted and a display control unit to drive the display screen. As the display screen, one of various display devices such as a liquid crystal display device is used. The display screen of the display unit 209 also functions as the input operation unit 204. In addition, on the display screen, various settings of the mobile terminal 20, calls, e-mail, and websites or the like via the Internet can be displayed. The display control unit is formed to read and display image data for display which is temporarily stored in the storage unit 208 on the display screen.

The power supply unit 210 supplies power to the respective parts of the mobile terminal 20. The power supply unit 210 is comprised of, e.g., a battery such as a lithium-ion battery or a nickel-metal hydride rechargeable battery, and a charging control unit.

Figure 3:
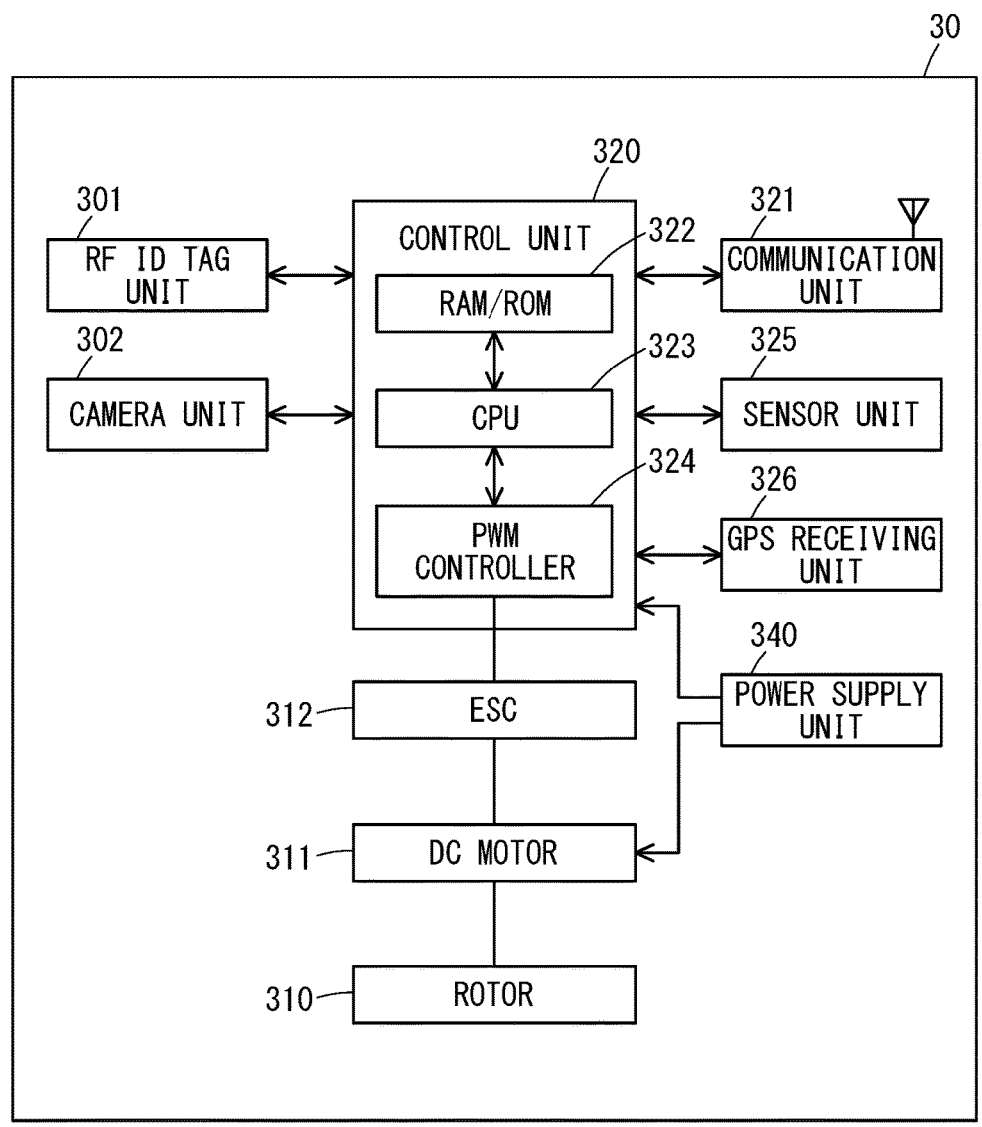
FIG. 3 is a block diagram depicting an outlined configuration of an unmanned aerial vehicle in the system for identifying an unmanned aerial vehicle in FIG. 1.

FIG. 3 is a block diagram depicting an outlined configuration of a multicopter which is a constituent element of the system for identifying an unmanned aerial vehicle in FIG. 1. Unnecessary components for describing the present invention are left out of the diagram of FIG. 3. As depicted in FIG. 3, the multicopter 30 includes an RF ID tag unit 301, a camera unit 302, rotors 310, a control unit 320, a communication unit 321, a sensor unit 325, a GPS receiving unit 326, a power supply unit 340, etc.

The RF ID tag unit 301 of the multicopter 30 is an IC tag which incorporates a semiconductor memory capable of storing data, is supplied with electric power by an induction field or radio waves, and is data readable and writable in a contactless manner. The RF ID tag is a wireless tag and any of a passive type (passive RF tag), an active type (active RF tag), and a semi-passive type (semi-passive RF tag) which is intermediate between both, classified according to an electric power supply method, may be used.

An active RF tag is an IC tag that operates with a built-in battery and has an advantage that its communication range is as wide as several tens of meters. A passive RF tag is an IC tag that operates with electric power supplied from an antenna or an RF reader or the like and has a communication range of approximately several meters. Although reading has to be performed in a position close to an RF reader, the passive RF tag has an advantage that its price is lower as compared with the active tag having a built-in power supply and no battery is needed.

As data that is stored in the RF ID tag unit 301, for example, individual object identification information (ID information) of the multicopter is used. Also, data on the operator of the multicopter, what it belongs to, and others may be stored.

Moving means of the multicopter 30 is comprised of a plurality of rotors 310 to produce lift, the control unit 320 which controls, inter alia, flight operations, and the power supply unit 340 among others. The multicopter 30 is formed to be able to move autonomously.

A DC motor 311 is coupled to each rotor 310 and connected to the control unit 320 via an ESC (Electric Speed Controller) 312. The control unit 320 is comprised of, inter alia, a CPU (central processing unit) 323, RAM/ROM (storage device) 322, and a PWM controller 324. The sensor unit 325 including an acceleration sensor, a gyroscope sensor (angular velocity sensor), an atmospheric pressure sensor, a geomagnetic sensor (electronic compass), etc. and the GPS receiving unit 326 among others are further connected to the control unit 320.

Control of the multicopter 30 is implemented in such a way that the PWM controller 324 adjusts the rotating speed of the DC motor 311 via the ESC 312. That is, it is possible to control the attitude and position of the multicopter by adjusting, inter alia, the balance between or among the rotational directions and rotating speeds of the plurality of rotors 300.

In the RAM/ROM 322 of the control unit 320, for example, a flight control program is stored in which flight control algorithms when the multicopter 30 flies are programmed. The control unit 321 can control the attitude and position of the multicopter 30 by the flight control program, using information acquired from the sensor unit 325 and other equipment. The multicopter 30 is thus configured to able to move according to a purpose, flying within a predefined range, through the moving means.

The multicopter 30 includes the camera unit 302 for monitoring and observing its surroundings and can take in image data from the camera unit 320. The multicopter 30 includes the communication unit 321 for transmitting image data taken in to the management server 50 and receiving data from the management server 50. A communication device capable of wireless transmission and receiving is used as the communication means 321.

In addition, although the multicopter 30 of the above example is able to move autonomously, an unmanned aerial vehicle for use as an unmanned moving object may be the one that can be made to move by remote manipulation.

The communication network 40 is a communication network that connects the mobile terminal 20 to external equipment via a radio base station and a gateway server among others. As for the communication network 40, for example, a variety of communication networks such as a telephone network, an ISDN network, a dedicated line, a mobile communication network, a communication satellite channel, and a CATV network, an IP network, a VoIP (Voice over Internet Protocol) gateway, an Internet service provider, etc. are included.

Figure 4:
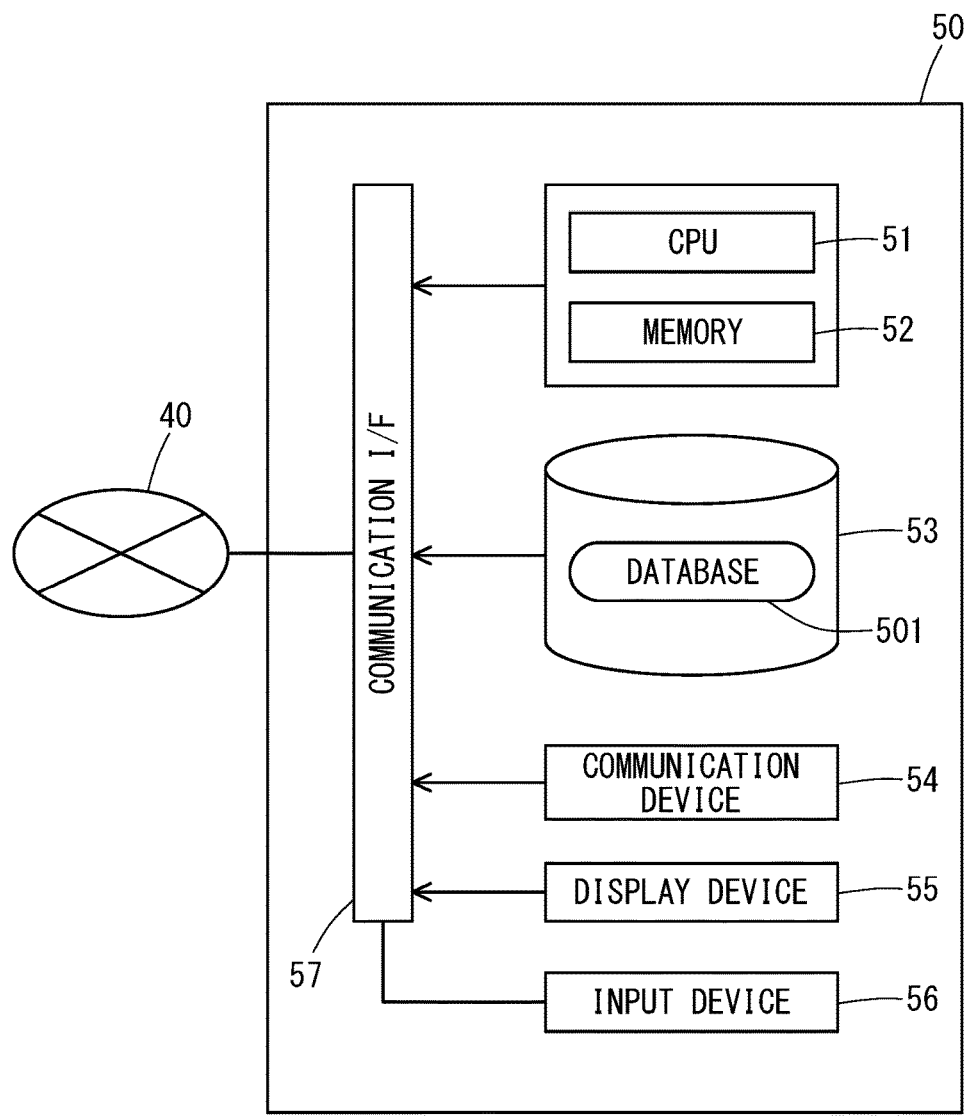
FIG. 4 is a block diagram depicting an outlined configuration of a server in the system for identifying an unmanned aerial vehicle in FIG. 1.

FIG. 4 is a block diagram depicting an outlined configuration of a management server which is a constituent element of the system for identifying an unmanned aerial vehicle in FIG. 1. The management server 50 is configured as a computer system and includes a CPU 51 as a central processing unit, a memory 52, an external storage device 53, a communication device 54, a display device 55, an input device 56, etc. which are connected to a communication interface 57. Moreover, the management server 50 is connected to the communication network 40 via the communication interface 57.

The memory 52 is used as a main storage and a control program and data to be executed by the CPU 51 are stored therein. The CPU 51 executes the control program, thereby executing processing steps which are illustrated in a flowchart or the like to be described later.

In the external storage device 53, specific information including possessor information of each individual multicopter and individual object management information that is associated with the specific information are stored as a database 501.

Specific information that is stored in the database 501 of the management server 50 may include, in addition to possessor information of the multicopter 30, possessor information of the operator of the multicopter 30, an organization to which it belongs, its administrator, etc., contact destination (report destination) information such as the phone number, e-mail address, address, etc. of the operator, a photographic image of external appearance of the multicopter 30, etc. Information other than the above that is useful for, inter alia, individual object identification may be used as specific information.

Individual object management information to be stored in the database 501 may be such information that associates identification information that the mobile terminal 20 can acquire from the multicopter 30 directly with specific information, and appropriate information as such may be used depending on identification information. For example, in a case where an RF ID tag is attached to the multicopter 30 and ID information in the RF ID tag is used as identification information, a table that correlates the ID information with specific information of a particular multicopter is used.

In addition, in a case where a multicopter's moving direction information comprised of, inter alia, positional information acquired using a camera function or the like and time information is used as identification information, a flight plan of the multicopter 30 is used as individual object management information. A flight plan is information representing a schedule by which the multicopter 30 will fly and information representing a combination of time information and positional information including coordinates at which the multicopter 30 will be present at a predetermined time instant. By using positional information including the coordinates of a position in which the multicopter 30 is preset at a predetermined time instant and referring to the flight plan, it is possible to particularize and identify an unmanned moving object.

Various sorts of information mentioned above should be input to the database 501 for each individual object unmanned moving object in advance when putting the system in practical use, using the display device 55 such as a liquid crystal panel and the input device 56 such as a keyboard.

Figure 5:
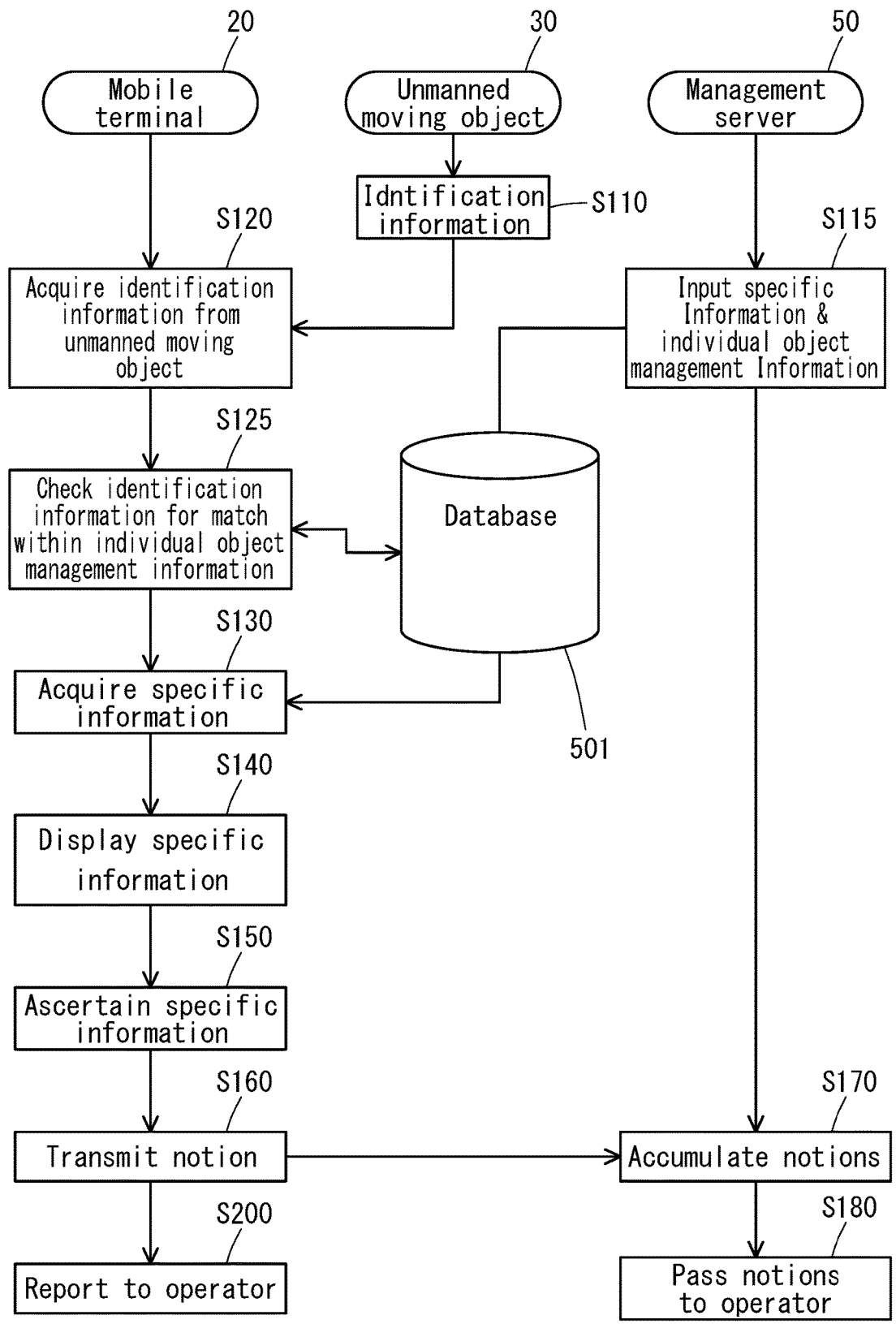
FIG. 5 is a flowchart illustrating a procedure of a method for putting the system for identifying an unmanned aerial vehicle of the present invention in practical use.

FIG. 5 is a flowchart illustrating a procedure for putting the system for identifying an unmanned aerial vehicle in FIG. 1 in practical use. Putting the system for identifying an unmanned aerial vehicle in practical use can be proceeded with according to the procedure with steps illustrated in FIG. 5.

S110: a step of registering identification information with the multicopter 30 in advance S115: a step of inputting specific information of each individual multicopter 30 and individual object management information to the database 510 on the management server 50 in advance S120: an identification information acquiring step in which the mobile terminal 20 acquires identification information from the multicopter S125: a step of checking the identification information for a match within individual object management information S130: a specific information acquiring step to acquire a multicopter's specific information from the database S140: a specific information displaying step to display the specific information on the display unit of the mobile terminal S150: a specific information ascertaining step to ascertain the specific information displayed on the display unit S160: a step of transmitting a notion for the multicopter operator to the management server S170: a step of accumulating notions for the multicopter operator on the management server S180: a step of passing accumulated notions to the multicopter operator S200: a step of reporting to the multicopter operator directly from the mobile terminal.

In the following, descriptions are provided about a method for putting the system for identifying a multicopter in practical use using concrete examples. FIG. 6 is a diagram illustrating a configuration of a distinctive part of an example of putting the system for identifying a multicopter in practical use of Example 1. As illustrated in FIG. 6, the identifying system of Example 1 uses ID information stored in the RF ID tag unit 30 of the multicopter 30 as identification information that can be acquired directly from the multicopter 30.

For example, as identification information, ID information is stored in the RF ID tag unit 301. Then, in identification information acquiring step 120, the ID information is loaded into the mobile terminal 20 as identification information through wireless communication between the RF reader unit 201 and the RF ID tag unit 301. Now, instead of the RF ID tag, NFC, "iBeacon" (trademark of Apple Inc.), BLE, and the like may be used.

In the specific information acquiring step S130, by checking the ID information for a match within individual object management information in the database 501 on the management server, the multicopter's specific information can be acquired. The individual object management information in this case is a table correlating ID information with specific information.

In this way, the mobile terminal 20 can acquire specific information such as the possessor information of the multicopter 30, etc. from the management server 50.

FIG. 7 is a diagram illustrating a configuration of a distinctive part of a method for putting the system for identifying a multicopter in practical use of Example 2. As illustrated in FIG. 7, the identifying system of Example 2 is a method that uses moving direction information of the multicopter 30 as identification information that can be acquired directly from the multicopter 30 and uses a flight plan of the multicopter as individual object management information that is input to the management server. When the multicopter 30 flies above and away, there are many cases where radio waves will not reach the RF reader unit 201 of the mobile terminal 20, because radio waves generated by the RD ID tag unit 301, mentioned in Example 1, are not so strong. In such a case, Example 2 is advantageous. This system does not utilize wireless communication between the RF ID tag unit and the RF reader unit, a flight plan of the multicopter filed in advance is input to the management server, and the system refers to positional information and time information as individual object management information.

Acquisition of moving direction information of the multicopter 30 utilizes a camera function using the camera unit 203, a GPS function using the GPS processing unit 202, and a gravity sensor function using the gravity sensor unit 220. Moving direction information is represented by data of a combination of positional information and time information of the multicopter 30.

Specifically, orient the camera unit 203 of the mobile terminal toward the multicopter 30, display its image on the display unit 209, and move the mobile terminal 20 to track the moving multicopter 30. Although the camera function may capture an image of the multicopter 30. The moving multicopter may be captured by a camera with an application and only tracked. The application is configured so that moving direction information can be acquired from positional information of the user S (mobile terminal 20) and orientation of the camera unit 203, moving direction, moving speed, time, etc. Information (moving direction information) corresponding to the position of the multicopter 30 and time, thus acquired, is used as identification information.

In the specific information acquiring step S130, moving direction information is checked for a match within individual object management information including a flight plan in the database 501 on the management server. As a result of the check, a multicopter matched with the flight plan in the database 501 is identified. The flight plan in the database 501 is associated with specific information of the particular multicopter. The specific information of the particular multicopter is transmitted to the mobile terminal 20.

In this way, Example 2 enables it to acquire specific information of the multicopter 30 from the moving direction information (identification information) acquired at the mobile terminal 20 and the flight plan (individual object management information) on the management server 50.

Furthermore, an application of the mobile terminal may be adapted to display a button to transmit a notion to the operator in step 160 on the display unit 209, which is configured of a touch panel, of the mobile terminal, so that a notion may be transmitted to the operator. Only by pressing this button, the user S can feed back a notion about the multicopter to the operator. Also, the step S200 of reporting to the operator may be executed in such away that, when the user S presses this button, the user's notion is directly transmitted to a server or an e-mail address of the operation.

Notions that are transmitted to the management server 50 by pressing the above button are handled in the step S170 of accumulating notions. Data transmitted to the management server is accumulated in the database of the management server with the transmitter's positional information held anonymous. Accumulated data can be used as statistical data. In addition, the step S180 of passing notions to the operator may be executed to transmit collected notions to the operator.

Concrete examples of buttons which may be displayed may include, for example, "Noisy", "It appears to be abnormal (abnormal sound was heard or flying abnormally)", "I don't want it to fly here", "Good", etc.

Now, the application may be configured to send a message describing a state of abnormality of the multicopter 30 directly to the e-mail address or the like of an administrator of the operator side. If the multicopter 30 is really abnormal, then a plurality of such messages will occur consecutively. However, if just one message occurs, there is a high possibility of a report of abnormality that was perceived erroneously. So, to avoid a misperceived message, the application may be configured to report to the administrator only if the number of times that abnormality has been reported has exceeded a predetermined number of times per predetermined unit time.

Also, the application may be configured to display not only a button to transmit a notion, but also a contact e-mail address, phone number, etc. together with the notion button on the display unit 209 of the mobile terminal.

Also, as identification information, it is preferable to use ID information in conjunction with a photographic image of the multicopter. In this way, it is possible to prevent plain spoofing like an ID card with a photograph. If there are plural multicopters in the vicinity of the user, a case is conceivable where plural pieces of identification information are provided to the mobile terminal and one multicopter cannot be identified. Even in this case, it becomes easy to identify an individual object when its photographic image is provided as specific information.

Furthermore, by making "report" within the application when the multicopter has landed or fallen unavoidably because of, inter alia, e.g., lack of power or failure of the multicopter, the operator is enabled to retrieve the multicopter easily. Upon this report, setting an incentive and adding it as specific information of the multicopter provide an advantageous effect that a crime such as taking away the multicopter can be prevented.

While an embodiment of the present invention has been described hereinbefore, the present invention is not limited to the foregoing embodiment and can be modified in various ways without departing from the gist of the present invention.

As an unmanned aerial vehicle for use in the present invention, it can be formed in various types, size, and shapes among others. For example, as for an unmanned aerial vehicle, aircraft with multiple rotors, a helicopter, quadcopter, hexacopter, octocopter, etc. are included.

In addition, as fields of application of the unmanned aerial vehicle, the vehicle can be used in a wide range of fields such as remote exploration, airborne surveillance, exploration, generation, and transportation of oil, gas, and minerals, scientific research, airborne photography or videography, map making, disaster report, study, and relief, map making, patrolling of electricity transmission lines, etc.

The unmanned aerial vehicle can be controlled autonomously by a controller or processor on the vehicle, remotely controlled by a remote device (for example, a station on land or a hand-held remote control device), or controlled in both ways.

In addition, the unmanned aerial vehicle can be configured to support a load device such as a video camera, via a supporter. This load device can be used to capture and a surrounding environmental image, collect samples, or carry out other operations.

As an unmanned moving object in the present invention, an unmanned motor vehicle or the like that is able to run on land by automatic driving may be used in addition to an unmanned aerial vehicle. An unmanned moving object may expediently be formed to be able to move in, inter alia, a space that is outdoor, indoor, on land, or in the air.

The invention claimed is:

1. A system for identifying an unmanned moving object, the system comprising:
   a mobile terminal including a camera, a GPS sensor, and a gravity sensor;
   an unmanned moving object;
   a management server including a database storing specific information including possessor information of the unmanned moving object and a flight plan, the flight plan including positional information and time information of the unmanned moving object; and
   a communication network enabling communication between the mobile terminal and the management server,
   wherein the mobile terminal is configured to:
      acquire the positional information and time information of the unmanned moving object by the GPS sensor and the gravity sensor upon a user of the mobile terminal tracking the unmanned moving object using the camera;
      check the acquired positional information and the acquired time information for a match with the flight plan on the management server and acquire specific information of the unmanned moving object; and
      display the possessor information of the unmanned moving object using the acquired specific information.

2. The system for identifying an unmanned moving object according to claim 1, wherein the mobile terminal includes a display configured to display the specific information including the possessor information.

3. The system for identifying an unmanned moving object according to claim 1, wherein the mobile terminal is further configured to: report a communication to an operator of the unmanned moving object.

4. The system for identifying an unmanned moving object according to claim 1, wherein the unmanned moving object is an unmanned aerial vehicle.

5. The system for identifying an unmanned moving object according to claim 1, wherein the specific information includes a photographic image of the unmanned moving object.

* * * * *